United States Patent

Muehleck

[11] Patent Number: 5,279,262
[45] Date of Patent: Jan. 18, 1994

[54] MECHANICAL LIQUID VAPORIZING WATERBRAKE

[76] Inventor: Norman J. Muehleck, 34735 Nashotah Rd., Oconomowoc, Wis. 53066-4542

[21] Appl. No.: 893,838

[22] Filed: Jun. 4, 1992

[51] Int. Cl.⁵ .............................................. F24C 9/00
[52] U.S. Cl. ........................................ 122/26; 126/247
[58] Field of Search ............ 122/26; 126/247; 237/1 R

[56] References Cited

U.S. PATENT DOCUMENTS

| | | | |
|---|---|---|---|
| 3,198,191 | 8/1965 | Wyszomirski | 126/247 |
| 4,264,826 | 4/1981 | Ullmann | 122/26 X |
| 4,277,020 | 7/1981 | Grenier | 126/247 X |

Primary Examiner—Edward G. Favors

[57] ABSTRACT

A water brake which uses mechanical power to kinetically heat water to vapor or steam, and use thereof as a steam generator or cooling water conserving dynamometer or motion retarder. In the simplest embodiment, radial impeller vanes (5b) throw water against stator vanes (6e); whence the water rebounds to the impeller (5). The peripheral rebounding movement continues back and forth. Power dissipates as heat in the water causing the water to increase in temperature and to vaporize. The vapor, being lower in density and viscosity than is the water, flows to and out a central outlet (9) while the denser water is centrifugally separated from the vapor and retained in the peripheral rebounding motion. Water leaving as vapor is continually replaced through a cooling water inlet (8), allowing continuous operation over wide ranges of speed, torque, power, and steam generation rates, both at steady state and at controlled rates of change.

17 Claims, 5 Drawing Sheets

MECHANICAL LIQUID VAPORIZING WATERBRAKE

FIELD OF THE INVENTION

This invention relates to non-combustion, liquid-vaporizing hydrokinetic water brakes useful as unfired steam generators, fluid brake motion retarders, and absorption dynamometers, individually and in combination.

BACKGROUND OF THE INVENTION

There is a longstanding need in the manufacture and service of prime movers, particularly of diesel engines exceeding 250 horsepower in power output, and of heavy duty vehicles such as highway trucks and coaches, for dynamometers, or test stands, which need far less cooling water than has been required prior to the present invention.

Water brakes used as absorption dynamometers or motion retarders utilize fluid friction or momentum exchange of water, or other liquid, to dissipate mechanical power delivered from a connected power source or power transmission shaft, such as the crankshaft of an engine to be tested, an axle shaft to be slowed, or the like, through use of a rotor, operating in a bath or spray of water or other liquid within a stator. Following the first law of thermodynamics regarding conservation of energy, the power dissipated in the liquid is converted to heat within the liquid, with the liquid being heated at a rate proportional to the amount of power being dissipated.

Power, "P", is an exact function of torque "T" and rotative speed "N", and is calculated from the relation $$P = TN/C.$$

where "C" is a constant dependant upon the units of measurement used for P, T, and N.

Heretofore, the heated liquid, usually water, has been discharged as hot water while being simultaneously replaced by cold water. This is referred to as "sensible heating"; i.e., the effect can be physically sensed as a temperature increase. For fresh water density of 8.33 lb./gal. and specific heat capacity of 1 BTU/lb./F°, power "P" in horsepower (hp), and entering cooling water temperature "$T_{in}$" and leaving temperature "$T_{out}$" (both in °F.), prior art cooling water flow, or consumption, rate "$Q_s$" is, in U.S. GPM (gallons per minute):

$$Q_s = (P)[(42.4 \ BTU/min.)/hp]\{1/[1 \ BTU/(lb.F°)]\} * (1 \ gal./8.33 \ lb.)[1/(T_{out} - T_{in})].$$

which reduces to $$Q_s = 5.1 * P/(T_{out} - T_{in})$$

$T_{out}$ is typically 160° F. and approximately 212° F. maximum, while $T_{in}$ is typically 55° F. and 32° F. minimum. The 32° F. and 212° F. are academic extremes and are rarely if ever encountered, as cooling water that cold in the quantities required is not economically available while a leaving temperature of 212° F. places a prior art water brake in danger of imminent explosion.

Substituting in and solving the above, $Q_s$ is typically 0.05, and academically at least 0.03, U.S. GPM per hp, which yields typical and minimum consumption rates of 20 GPM and 12 GPM respectively for, as an example, a 400 hp power source.

Prior art water brakes have been incapable of sustained biphase operation (i.e., with liquid and vapor in equilibrium) due to inability to separate steam from water and allow the steam to leave in quantities sufficient to avert excessive internal pressure from arising, whereas the present invention instead retains the heated water until it vaporizes and is discharged as steam. In so doing, the rate of cooling water consumption for sustained operation is greatly reduced; for the same operating conditions cited above and utilizing the 970 BTU/lb. latent heat of vaporization of fresh water, the present invention's consumption rate "$IQ_v$", again in U.S. GPM, is $$Q_v = (P)[142.4 \ BTU/min.)/hp]\{1 \ lb./(970 \ BTU + (212 - T_{in})BTU/F°]\}(1 \ gal./8.33 \ lb.),$$

which reduces to $$Q_v 5.1\{P/[970 + (212 - T_{in})]\} GPM$$

for cooling water either at or below boiling point, which further reduces to $$Q_v 0.005 * P \ GPM$$

for cooling water at its boiling point.

Substitution and solving yields present invention cooling water consumption rates of 0.0045 GPM per hp for 55° F. cooling water, and 0.005 GPM per hp for 212° F. cooling water; only 2 GPM for the 400 hp example above, or an order of magnitude (90%) less than the prior art, sensible heat water brake.

Additionally, the present invention can readily utilize cooling water entering at any temperature up to the boiling point while prior art waterbrakes typically require a large temperature difference between cold water entering and hot water leaving, and must be derated in capacity if this temperature difference is not available.

To accommodate differing and varying torque inputs in most applications, water brake retarders and, especially, dynamometers must have an adjustment or control capability; i.e., the amount of torque load they present their power sources must be controllable. In water brakes, this is most commonly done by adjusting the amount of water contained within the apparatus's housing and therefore in motion between rotor and stator. Operation must, in some applications, be controllably rangeable over a ratio of 50 to 1 in torque load.

The present invention belongs also to another class of invention, the mechanical liquid vaporizer. There are other mechanical liquid vaporizers in the prior art, but none are known to the applicant to be useable in sustained commercial operation as a retarder or dynamometer without disadvantage or deficiency as described immediately below and, in many cases, without addition of a heat transfer fluid loop. Only mechanical liquid vaporizers driven by moving shafts, whether rotatitive or linear, are considered herein; those utilizing electrical discharges, refrigerants, gasses, and the like are outside the scope of the present invention.

U.S. Pat. No. 3,198,191 (Wyszomirski, 1965), represented, specified, and claimed only as a heat generator, was, like the present invention, also a tangential water brake. Its squirrel cage impeller blades, however, by their very nature being not of full radial depth, precluded large adjustability of amount of water being impacted by the vanes or blades and therefore could not provide sufficient rangeability of torque load for general use as a retarder or dynamometer. Additionally, the squirrel cage blades and unobstructed inner chamber within the inner diameter of those blades allowed steam egress but did nothing to separate, remove, and recirculate particles of water entrained in the rapidly flowing steam, resulting in undesireably wetter steam at low operating speeds. Moreover, the construction of this device necessitated use of a relatively complex steam discharge tube assembly comprising inner and outer tubes, bearing, seal, leakage drain hole, and closely machined fits.

U.S. Pat. No. 1,149,938 (Naglevoort, 1915) was a tangential water brake but did not vaporize its cooling water.

U.S. Pat. No. 14,277,020 (Grenier, 1979) was a water brake of the viscous shear type and was intended primarily to heat liquid in a two-loop heat exchange system, but could also vaporize the liquid within the water brake. It was not, however, adjustable in torque load, and lacked means of discharging safely large quantities of steam and of separating entrained water particles from the steam.

U.S. Pat. No. 2,344,075 (Beldimano, 1944) was also a water brake and also used a heat transfer loop, in this case a water jacket surrounding the oil-filled water" brake. No steam generation or controllability were referred to.

U.S. Pat. No. 3,791,349 (Schaefer, 1974) was a steam generator, but not adjustable in torque load. Additionally, it utilized rapidly repeated water hammer, or fluid shock, within closed tortuous passageways; such phenomena are not normally regarded as conducive to long and troublefree life.

U.S. Pat. No. 4,781,151 (Wolpert et al., 1988) and U.S. Pat. No. 4,271,790 (Ahmed et al., 1981) were other embodiments of water brakes, neither adjustable in torque load and both utilizing two-loop heat transfer circuits.

U.S. Pat. No. 4,115,027 (Thomas, 1978) and U.S. Pat. No. 5,003,829 (DeConti and Quenneville, 1991) are representative of water cooled mechanical friction brakes (typically of drum, disk, or band styles), which can generate steam and are responsive to control actions over large ranges of operation. Under sustained heavy load, however, they require frequent replacement of sacrificial wear pads or blocks, and are prone to rotor failure caused by heat distortion and material heat checking. Depending upon aggressiveness of friction material selected, which must be carefully balanced with other factors including wear rate of friction pad material, they can also chatter or become unstable in torque load, particularly at very light or heavy load levels.

The above are representative of prior art waterbrakes which do not vaporize their cooling water (or other fluid) and hence require relatively large coolant flow rates, and of mechanical liquid vaporizers which lack the appropriate attributes of a water brake to an extent sufficient to preclude extended or sustained use as retarders or dynamometers.

The present invention is therefore a novel and very useful solution to prior art limitations in that it is a water brake which requires little cooling water and which discharges steam, instead of hot water, as either end product or byproduct, as the user wishes, and therefore can be used as steam generator, motion retarder, or dynamometer, either individually or simultaneously in combination. It generates steam with an efficiency of very nearly 100% since, except for minor radiation and convection losses from the apparatus's housing (which can themselves be made even smaller by covering the housing with thermal insulation), power entering through the shaft is all converted to thermal energy in the heating and vaporizing of water. Testing has shown it to be stable in speed and in torque load imposed upon a prime mover. Further, it's of simple design, easily manufactured and suitable for robust construction, and operates equally well in any angle of orientation, i.e., with shaft horizontal, vertical, or any angle between.

OBJECTS AND ADVANTAGES

A principal object of the present invention is to provide a water brake requiring significantly less cooling water than has heretofore been required.

An important object of this invention is to provide a mechanically shaft powered steam generator of simple design and construction, of long life with little need for maintenance, with no sacrificial wear parts or susceptibility to damage or degradation by heat checking as in a mechanical friction brake or by intense shock such as water hammer, and with means to remove water entrained in steam exhaust and thereby provide dry steam of high quality at various speed and torque levels of operation.

Another important object of this invention is to provide an apparatus useable for either water brake or steam generator or for both purposes simultaneously, with good characteristics of stability in steady-state operation, of responsiveness to change in load or speed setpoint, and hence of good controllability.

Another object of this invention is to provide said apparatus with wide rangeability of (i.e., ratio of maximum to minimum in) speed, load, and steam generation rate controllable operating points.

Further objects and advantages of the present invention will become apparent when viewing the accompanying drawings and reading their descriptions, in which:

DESCRIPTION OF DRAWINGS

Figure 1:
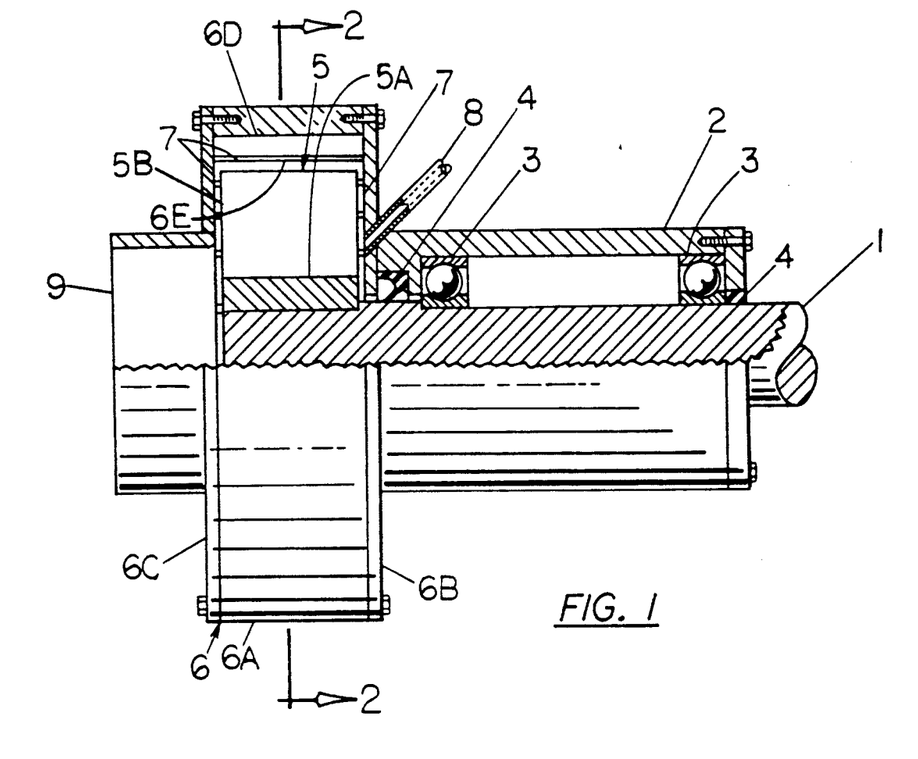
FIG. 1 is a side elevation view of a preferred embodiment of the invention.
Figure 2:
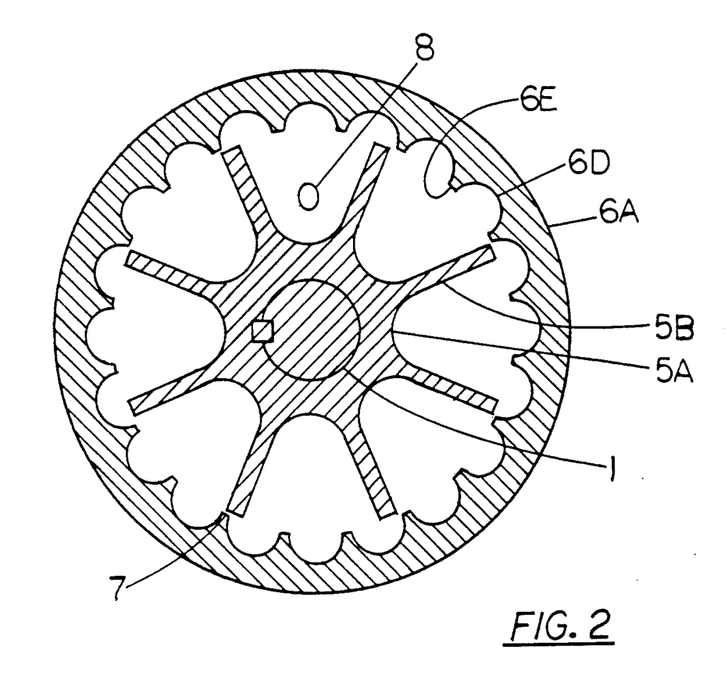
FIG. 2 is a cross-sectional elevation view taken along line 2—2 of FIG. 1.

In FIGS. 1 and 2, an embodiment of the invention is shown as comprising an apparatus having a rotatable assembly contained within a stationary assembly as in a rotative liquid pump. An impeller 5, comprising vanes 5b preferedly extending fully and radially outward (i.e., not of the narrowly slatted construction often known as "squirrel cage") from hub 5a, is firmly secured to freely rotatable shaft 1 using an interference fit and key or comparable retention and torque transmission means. The shaft 1 is conventionally supported within a stationary bearing carrier 2 by bearings 3, which are protected by seals 4. The bearing carrier 2 is rigidly connected to vaporizing chamber 6 by means such as machine screws, welding, casting integrally with the housing, or the like. The chamber 6 comprises a stator 6a, a bearing-side closure plate 6b, and an outlet-side closure plate 6c. The inner surface of the stator 6a comprises a plurality of radial vanes 6e partitioning pockets 6d. A small clearance gap 7 separates chamber 6 from impeller 5 on all sides. An inlet port 8 is located to direct water into the open spaces between the aforesaid vanes 5b of impeller 5. A larger longitudinally disposed outlet port 9 for discharging steam is located in the outlet-side closure plate 6c, centered on the impeller 5 and shaft 1 common axis of rotation. The outlet port 9 need only be the hole shown in outlet-side closure plate 6c, with the stubbed-off tube shown extending outwardly from the hole being merely an optional convenience to facilitate connecting a hose, tube, or like conductor for the purpose of delivering steam to a remote place of use or disposal.

Referring further to FIG. 2, the simplest and most readily manufactured embodiment of the invention is shown. This embodiment has flat, fully radially disposed impeller vanes 5b and, similarly, stator vanes 6e and pockets 6d.

Figure 3:
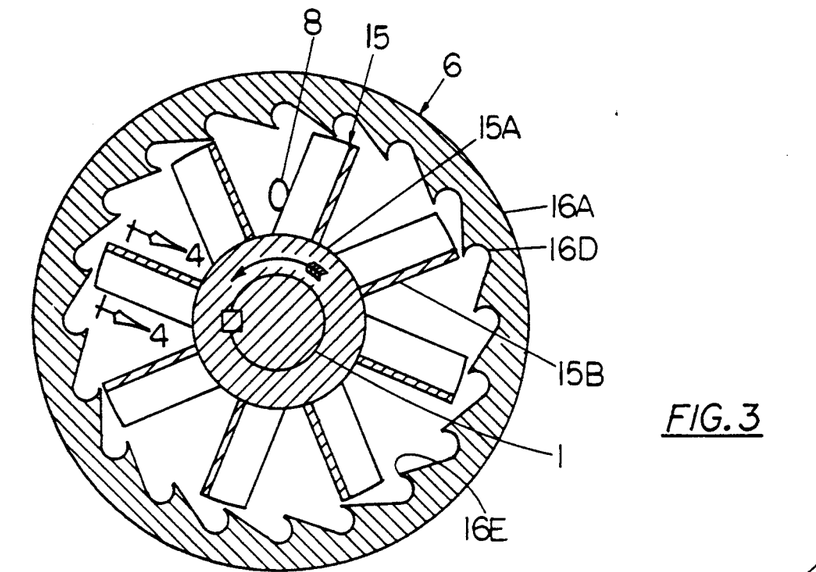
FIG. 3 is a cross-sectional elevation view similar to that of FIG. 2, showing an alternative embodiment of the invention.
Figures 4, 5:
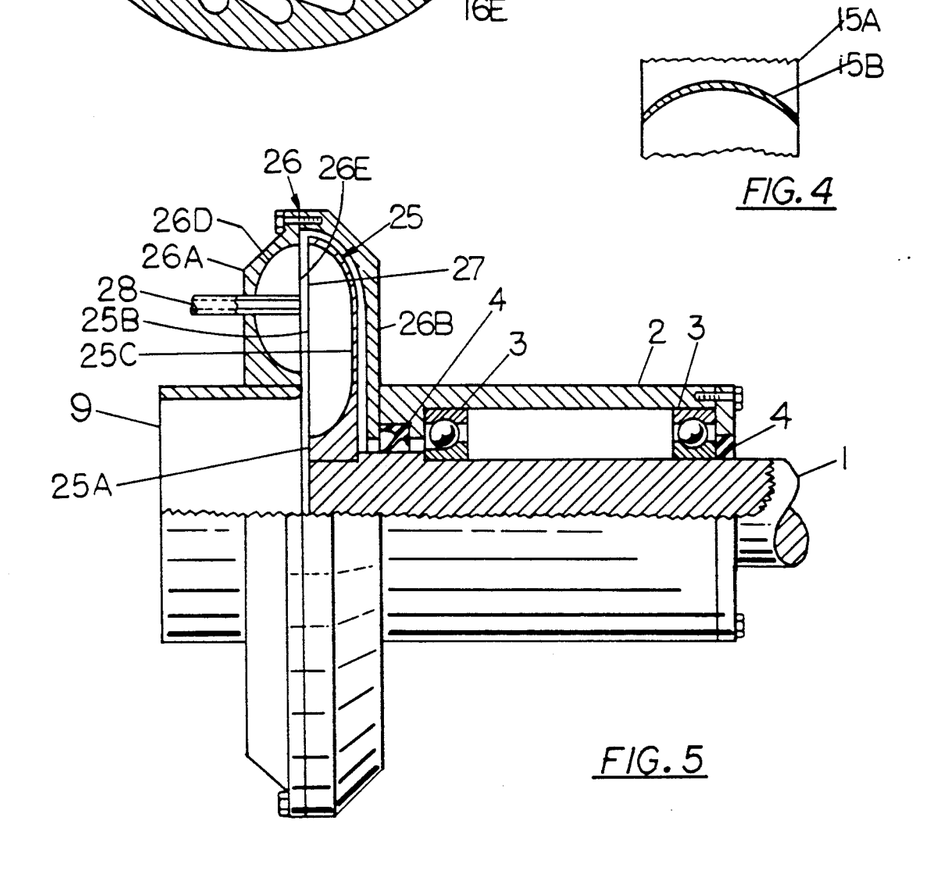
FIG. 4 is a sectional view taken along line 4—4 of FIG. 3.
FIG. 5, 6, 7, and 8 are side elevation views of additional embodiments of the invention.

The cross-sectional view of FIG. 3 illustrates another of many possible embodiments of the invention. It differs from the embodiment shown in FIGS. 1 and 2 only as described below. In FIG. 3, the apparatus has an impeller 15 having impeller vanes 15b and a stator 16 having stator vanes 16e partitioning stator pockets 16d. The impeller vane 15b is also illustrated in the transverse sectional view of FIG. 4, showing that the vanes and pockets are scoop-shaped; i.e., concave toward one direction of rotation and convex toward the other, in the manner of single-direction, non-reversible tangential impulse turbine wheels and runners. Other variations, such as the forward and backward curving and slanting often done with centrifugal pump and blower impellers, are possible and illustrations of such abound in engineering handbooks and the literature.

A further embodiment of the invention is shown in FIG. 5, wherein the tangential-flow paddle wheel configuration of the impellers in embodiments of FIGS. 1 through 4 is replaced by axial-flow, vane-partitioned toroidal cavities such as are commonly used in industrial hydrokinetic fluid shaft couplings and in conventional momentum exchange water brakes. As in the embodiments of FIGS. 1 through 4, the embodiment of FIG. 5 comprises a rotatable assembly contained within a stationary assembly. A disc-shaped impeller 25 is firmly secured to shaft 1 and comprises a hub portion 25a, an annular toroidal cavity 25c disposed in one face of the impeller, and radial vanes 25b partitioning said cavity into pockets. The shaft 1 is supported within a stationary bearing carrier 2 by bearings 3, which are protected by seals 4. The bearing carrier 2 is rigidly connected by means such as machine screws, welding, casting integrally, or the like to a vaporizing chamber 26. The chamber 26 comprises a stator 26a and closure plate 26b, the stator being provided with an annular toroidal cavity 26d and partitioned into pockets by radial vanes 26e. The stator cavity faces the impeller cavity in close proximity separated only by a small clearance gap 27, and may be of similar shape and size except that the stator cavity toroid inner diameter is larger than is that of the impeller. An inlet port 28 is provided in housing 26, projecting through stator 26a and its chamber 26d approximately flush with gap 27 to direct water into impeller chamber 25c. A larger longitudinally disposed outlet port 9 for discharging steam is located in the stator 26a, centered on the impeller 25's and shaft 1's common axis of rotation. Alternatively, both sides of the impeller 25 may be provided with partitioned toroidal cavities 26c and each side faced with a stator 26 having partitioned toroidal cavity 26d and outlet port 9. Closure plate 26b is then eliminated, and shaft 1 supported by bearings in any of the manners common to rotative pumps with a bearing at the same end as a central inlet or outlet port.

Figure 6:
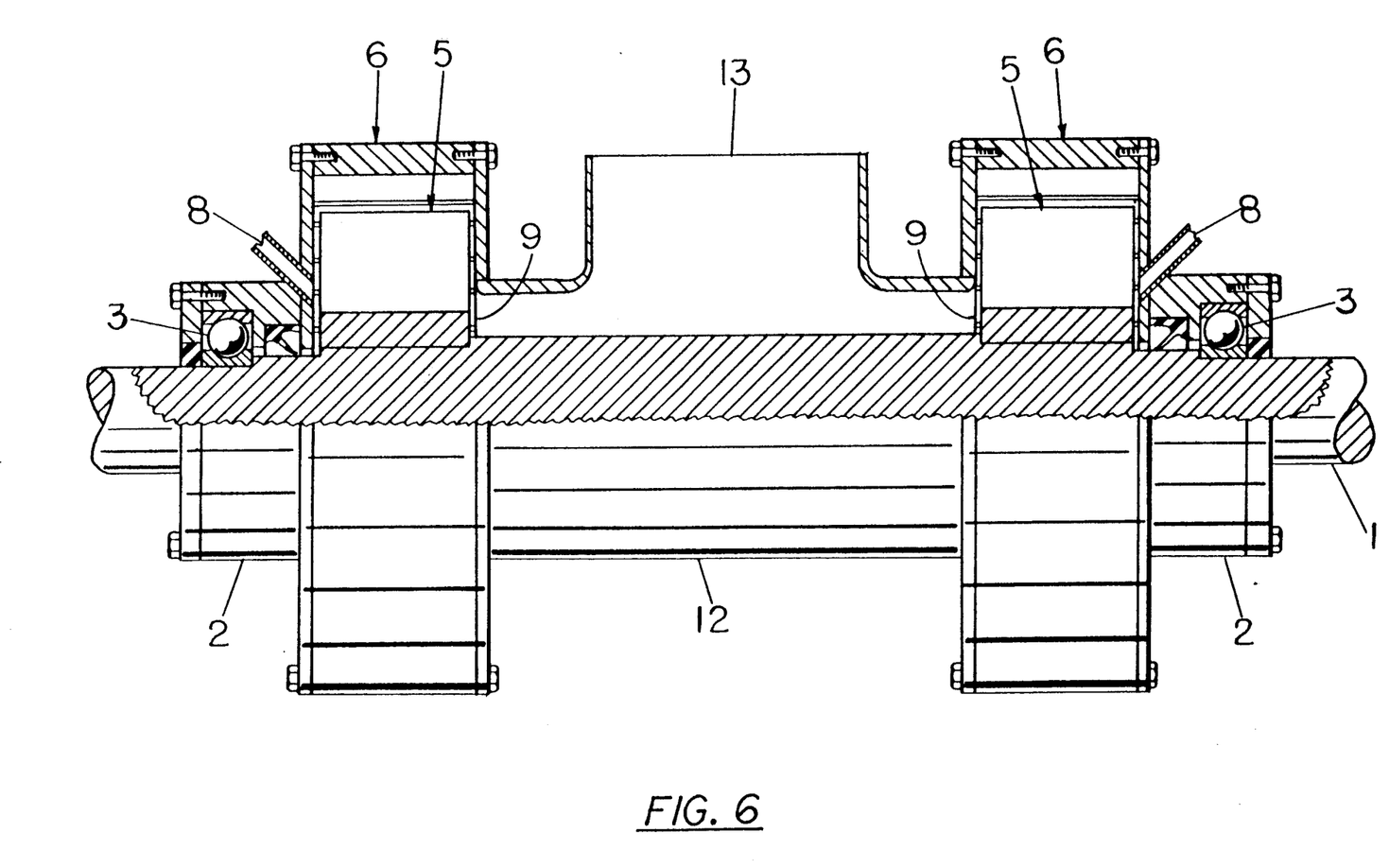

FIG. 6 shows a tandem embodiment of the invention, wherein two of the water brakes shown in FIG. 1 are located on the same axis of rotation. In FIG. 6, the outlet ports 9 are disposed facing each other and connected by a manifold 12 having an outlet port 13 for the combined vapor discharges. Both water brakes share a single shaft 1 which passes through the manifold 12 and connects the two impellers 5, the manifold 12 serving also to rigidly connect the two vaporizing chambers 6. This tandem arrangement can also be applied to the other embodiments described herein.

Figure 7:
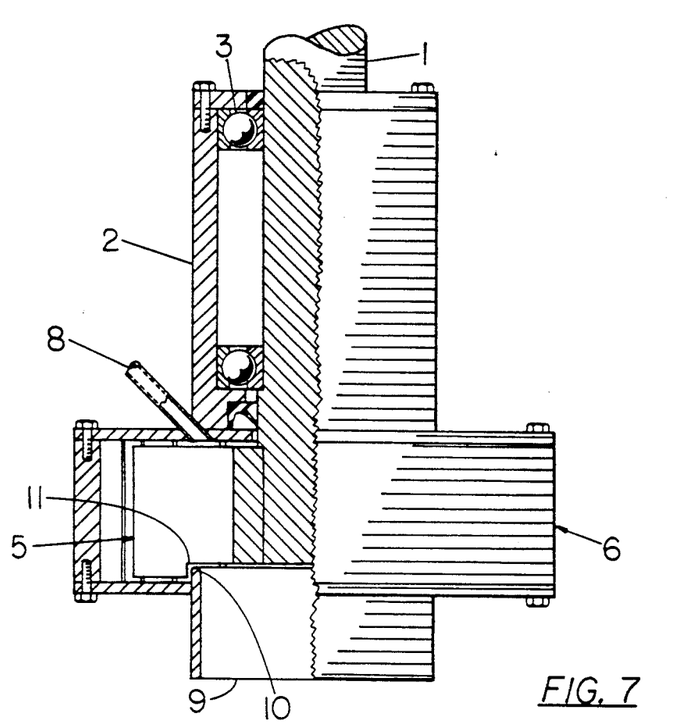

Another embodiment of the invention, similar to that shown in FIG. 1, is illustrated in FIG. 7. The embodiment of FIG. 7 differs from that of FIG. 1 in the showing of a vertical axis of rotation of shaft 1 and impeller 5 for the horizontal axis shown, but not necessary, in FIG. 1 and in the other Figures. In addition, a tubular extension 10 is provided at the inner end of outlet port 9 and a recess 11 in impeller 5 and shaft 1 is included to accommodate the tubular extension 10. Other details are as described previously for the embodiment of FIG. 1.

Figure 8:
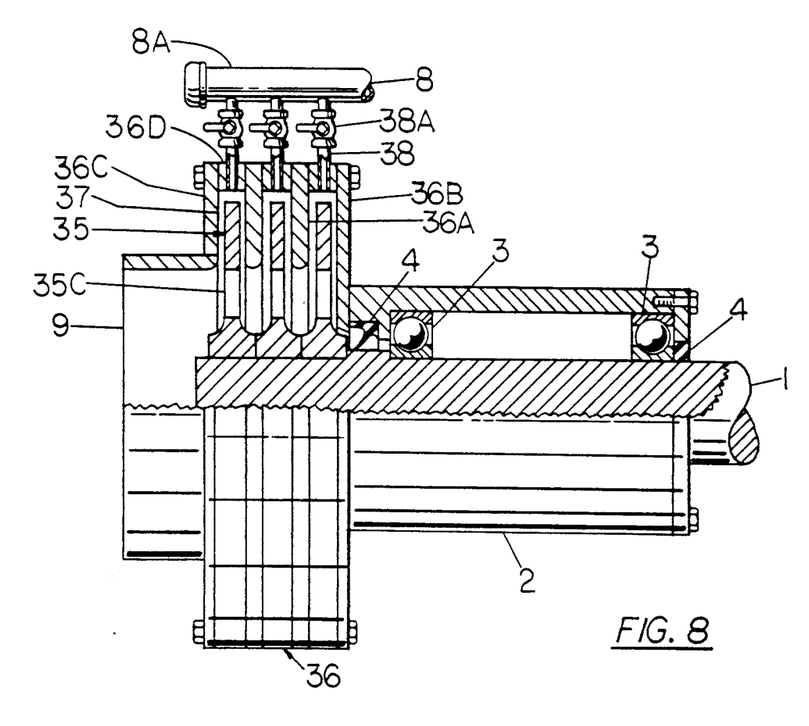

Still another embodiment of the invention is illustrated in FIG. 8. This embodiment differs from the embodiments of FIGS. 1 through 7 in that it is a viscous shear, and not momentum exchange, water brake and hence need have no vanes, pockets, or other irregularities on the working surfaces of an impeller 35 and a vaporizing chamber 36. A shaft 1, bearing carrier 2, bearings 3, seals 4, and vapor discharge port 9 are similar to those of the FIG. 1 embodiment. One or more impellers 35 are secured to the shaft 1 by suitable retention and torque transmission means, and contained within the chamber 36. The chamber 36 comprises closure plates 36b and 36c and partition plates 36a interposed with spacer rings 36d to form an individual stator chamber surrounding each impeller. Vent holes 35c are provided in impellers 35 and partition plates 36a to facilitate flow of vapor from all stator chambers through successive impellers to the vapor discharge port 9. Each chamber is provided with a separate inlet port and tube 38, the tubes being connected in parallel to a common water manifold 8a for water supplied through inlet port 8. Each stator chamber inlet tube 38 may be provided with an optional flow adjustment or shutoff valve 38a as has sometimes been done with prior art water brakes to increase rangeability.

Additionally, the smooth faces of impellers, partition plates, and closure plates may be provided with recesses or holes as has been sometimes done with prior art water brakes to increase medium speed torque capacity.

Figure 9:
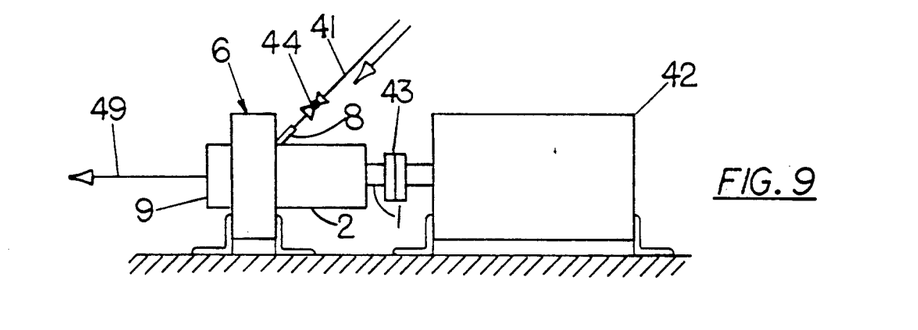
FIG. 9 shows use of the invention as a motion retarder.
Figure 10:
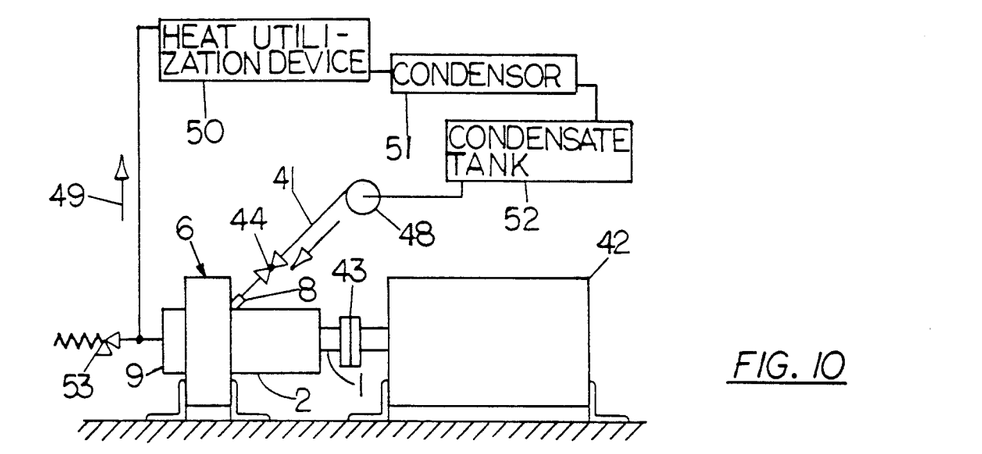
FIG. 10 shows use of the invention as a steam generator.
Figure 11:
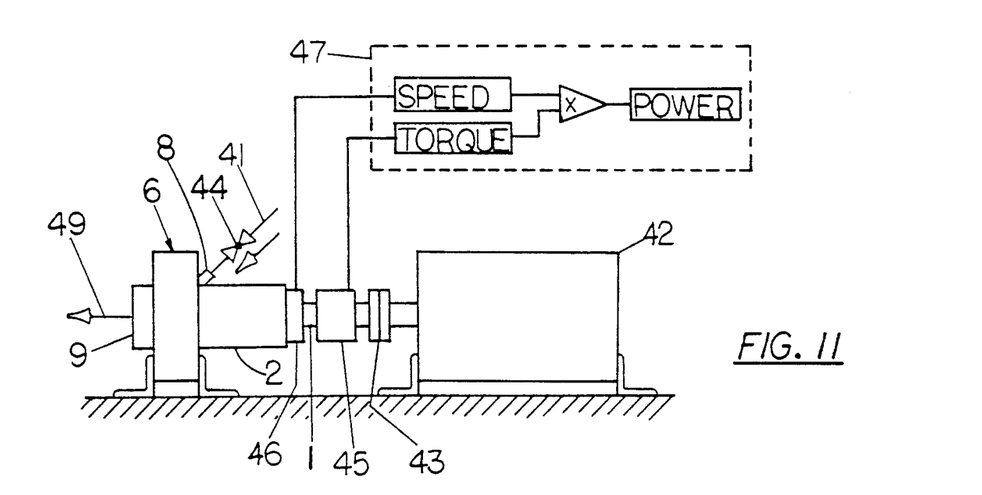
FIG. 11 shows use of the invention as a dynamometer.

FIGS. 9, 10, and 11, showing applications of the invention, are described in "Operation" below.

OPERATION OF THE INVENTION

In the momentum exchange waterbrake embodiments of the apparatus shown in FIGS. 1 and 2, water within the chamber 6 is encountered by one of the moving impeller vanes 5b, and spun spirally outward into the stator pockets 6d and against the sides of the stator vanes 6e. Against the sides of the stator vanes, the tangential component of the water velocity becomes a stagnation pressure $V^2/2g$. This pressure, integrated over the projected area of the vanes 6e, produces a rotational force and a static torque equal to that force summed over all the vanes 6e multiplied by the mean impacted radius of those vanes. An opposing torque exists upon the impeller 5 as the water decelerated and rebounded by the stator splashes back against the impeller vanes 5b where it exerts a similar stagnation pressure, giving rise to an equal and opposite dynamic countertorque. This countertorque has a braking effect upon the mechanical power source, which may be increased or decreased by increasing or decreasing cooling water flow and thereby the amount of water contained within vaporizing chamber 6 and in play between rotor 5 and stator 6a. The steam, being of much lower density and viscosity than is the water, readily flows to the large central discharge port 9 while the denser water is kept in motion between the impeller vanes 5b and stator 6a. At any time the system is left to stabilize without further valve adjustment or other disturbing action, steam flow rate out becomes equal to water flow rate in by weight and the system reaches equilibrium and remains in steady state operation.

Operation of the embodiment shown in FIGS. 3 and 4 is similar to that of the embodiment shown in FIGS. 1 and 2 described in the foregoing paragraph with the exception that the scoop-like vanes 5b shown in FIGS. 3 and 4 increase the tangential component of water velocity, and thereby torque, in the direction of rotation shown and at a given speed, at the expense of providing little useable torque capacity in the opposite direction of rotation. The concave vane faces more effectively trap and accelerate the water and also reduce axial spillage. This allows smaller, lower-inertia impellers as well as use with higher torque, lower speed power sources.

Operation of the embodiment shown in FIG. 5 with its axial flow turbine water brake geometry is as described above for the FIG. 1 embodiment with these exceptions: (a) The water flow inside the combined impeller and stator torn 25c and 26d has an axial, or longitudinal, vector component as well as the radial and tangential components of the other embodiments, which gives rise to a longitudinal thrust which must be considered in bearing selection, bearing mount design, and bolt circle (or weld or other attaching means) design; and (b) centrifugal water separation from steam is not performed by the entire impeller vane 25b as in the other embodiments, but only by that portion of each impeller vane 25b which projects inward (i.e., toward the shaft 1 centerline) farther than do the stator vanes 26e. Analagous to FIG. 3 and 4, the vanes 25b and 26e of the FIG. 5 embodiment may be tilted so as to scoop the water in one direction of rotation, increasing torque and power capacity in that direction although greatly reducing capacity in the opposite direction of rotation. Operation is otherwise similar to that of the FIG. 1 embodiment.

The embodiment of FIG. 6 is a means of increasing low speed torque capacity while operating in the manner of the FIG. 1 embodiment. The FIG. 6 embodiment retains the bidirectionality of the FIG. 1 embodiment or, if combined with the vane 15b and 16e configurations of FIGS. 3 and 4, obtains even more torque capacity at still lower speeds, although with loss of bidirectionality if both impeller and stator vanes are scooped in the same direction of rotation, which they need not be. The embodiment of FIG. 7 is particularly suited for use with vertical shaft power sources, though also useable with horizontal shaft power sources. In vertical operation, the outlet tube extension 10 serves as a dam to keep axial impeller vane 5b spillage from pouring out the outlet port 9 before it can be recirculated by the impeller vanes 5b and vaporized. Operation is otherwise identical to that of the FIG. 1 embodiment.

The embodiment of FIG. 8 is a high speed, viscous shear water brake differing in operation from the embodiments of FIGS. 1 through 7 described previously, in the use of fluid friction instead of momentum exchange to convert shaft power to heating and vaporizing of liquid coolant. As in the other embodiments, the steam, being of much lower density and viscosity than is the water, readily flows to the large central discharge port 9 while the denser water is kept in motion. In this embodiment water is centrifugally accelerated against the inner peripheral surfaces of the vaporizing chamber 36 by frictional drag of one or more of the impellers 35, while in the other embodiments impeller vanes perform this function. Vent holes 35c facilitate vapor flow through successive impellers 35 and partition plates 36a from those chambers which are located farther from the discharge port 9. The water manifold 8a, or any water source of sufficient size, distributes water to each of the stator chambers for operation at loads near the capacity of this embodiment of the invention, while one or more chambers may be partially or wholly deactivated for use with small power sources by partially or fully closing corresponding valves 38a in order to facilitate ease of control and extend controllable range of operation.

FIG. 9 shows the invention used as a fluid brake motion retarder, connected to a power source 42 by a suitable power transmission means 43 and supplied with liquid coolant through pipe or hose 41. Torque load imposed by the apparatus upon the power source may be controlled by liquid flow modulating valve 44. Steam may be dissipated in the direction of the arrow 49 to atmosphere as shown or otherwise disposed of, or may be utilized as desired. Some applications are dynamic braking of crane and mine hoist cable drums, of heavy vehicles or equipment descending long or steep grades, and of heavy vehicles or equipment making frequent stops or decelerations.

FIG. 10 shows the invention used as a steam generator, connected and controlled as in FIG. 9. Steam is piped or otherwise conducted from the outlet port 9, which is provided with a safety pressure relief valve 53, to a heat utilization device 50 which uses the steam's thermal energy, such as a heating unit, steam engine, or chemical or food processing device or system. Liquid condensate may be formed in condensor 51 and drained to a collecting and holding condensate tank 52, from whence gravity or pump 48 may supply water through flow modulating valve 44 to apparatus inlet port 8, or the condensate may be disposed of and cooling water supplied to inlet port 8 from another source. Steam generation rate may be controlled with valve 44, with or without additional control by adjustment of energy supply rate (e.g., throttle position or fuel pressure for an engine, voltage or frequency for an electric motor, etc.) to the power source. For an internal combustion engine, FIG. 10 can be expanded to add additional steam generation by ebullient cooling of the engine combustion chambers if water cooled, and of its exhaust piping and silencer, for recovery as heat of almost all the engine's fuel energy content.

FIG. 11 shows the invention used as a dynamometer connected and controlled as in FIGS. 9 and 10. Steam may be dissipated to atmosphere as shown, or may be utilized as shown in FIG. 9. Torque and speed are measured with sensors 45 and 46 and displayed or recorded in instrumentation 47, with or without the additional computation-and display of power shown. Torque need not be measured by the inline transducer shown, but may alternatively be measured by the more common method of supporting the water brake on trunnion bearings or flexural supports and restraining stator rotation by a force-measuring device, such as a weighing scale or a load cell with output signal proportional to mechanical force input, located at an accurately known distance from the center of shaft rotation and hence producing a reading or instrument signal directly proportional to torque, as is commonly done with prior art dynamometers.

CONCLUSION, RAMIFICATIONS, AND SCOPE OF THE INVENTION

From the foregoing description, it can be seen that the invention is a practical mechanical liquid vaporizer well suited for use as a motion retarder or dynamometer as well as a steam generator. The invention is, further, novel in its simplicity and effectiveness of steam/water separation and well conceived to eliminate problems of high cooling water consumption rate, destructive shock and water hammer, rapid wear and short life, and high manufacturing cost, as well as to provide large range of controllable, stable, responsive operation.

It will be understood that the foregoing description of the present invention is for purposes of illustration only, and that the invention is susceptible to modifications or changes, none of which entail any departure from the specified scope of the present invention as defined in the hereto appended claims. For example, the diameter versus length ratios shown approximately for impellers and stators may vary widely with power source maximum torque and speed capabilities. The bearing and seal arrangements shown will vary for steam load system back pressure and for overhung loads such as are imposed by chain or belt drives. Impeller vanes may be cast, forged, or extruded integral with impeller hub or may be welded or dovetailed or otherwise secured to a separate hub. The inlet end of outlet port 9 may be flared to facilitate smoothness of steam flow and preclude formation of eddies and venae contractae. The impeller vanes may be provided with one or more circumferential stiffeners and may be tapered in side and/or end elevation views to reduce rotating assembly mass moment of inertia. The working and cooling fluid need not be water but may be another liquid which has a latent heat of vaporization upon being heated by input of mechanical power. The apparatus need not have its own shaft but may have its impeller firmly rotationally affixed to an extended power source shaft or flywheel or the like, with its stator either journaled to this extension with bearings or firmly affixed to the power source stator without bearings. The stationary discharge ports shown may be replaced by making the solid shaft shown a tubular hollow shaft and using its bore as a discharge port, especially for belt, chain, or other non-colinear power transmission means from the power source. A condensing heat exchanger may be added at the discharge port to transfer heat to a secondary fluid loop and the vaporization thereby made part of a closed or semi-closed system. The embodiment of FIG. 5 may have both sides of impeller 25 provided with the toroidal chamber 25d shown on one side, and closure plate 26b correspondingly replaced by a second stator 26a. The embodiment of FIG. 8 may have holes or pockets formed, as by drilling, in the smooth faces of impeller 35, partition plates 36a, and/or closure plates 36b and 36c to combine momentum exchange with viscous shear for more capacity at moderately high speeds, as is sometimes done with prior art turbine engine water brake dynamometers. Cooling water flow, and hence speed, torque, and steam generation rate, may be regulated by a controllably variable flow water pump in place of modulating valve 44.

What is claimed is:

1. A hydrodynamic liquid vaporizer which is connected to and supplied by a source of liquid such as water and which comprises a water brake including:
   a stator housing including a vapor generating chamber having a vapor exit port comprising an opening in the center of the end of the chamber, and
   a rotative impeller means rotably supported within said chamber and connected to and driven by a mechanical power source, the impeller means
   (a) having its central axis of rotation disposed so that it passes approximately through the center of said chamber opening,
   (b) contacting and hurling or shearing said liquid against closely proximate surfaces of said stator in order to kinetically heat the liquid and vaporize a portion of it, the rate of vaporization proportional to the rate of input of mechanical power and occurring without regard to generation of vortex or vorteces in the liquid or the vapor, and
   (c) constructed with means of said hurling or shearing, as with vanes or wetted surface, having a radial dimension extending preferedly fully inward to a hub or like central portion of the impeller, so as both to centrifugally separate the heavier liquid from the lighter vapor and to provide large range of controllable amount of torque load upon the impeller by means of controlling the amount of liquid that is within the chamber and is thereby acting upon the impeller.

2. The liquid vaporizer according to claim 1 wherein:
   the impeller means has a plurality of longitudinally disposed vanes or vanelike protuberances extending radially inward from its periphery toward its hub or like central portion of the impeller and partitioning the impeller into pockets, and
   the chamber has a stator ring portion surrounding proximately the periphery of the impeller, said stator ring including a plurality of longitudinally disposed vanes or vanelike protuberances extending radially inward toward the impeller means peripheral vane tips and partitioning the inside of the stator ring into pockets.

3. The liquid vaporizer according to claim 1, wherein:

The impeller means has an axially facing toroidal cavity centered on the impeller means axis of rotation and having a plurality of radially disposed vanes disposed within said cavity partitioning the cavity into pockets, and the chamber has a stator end wall including an axially and oppositely facing toroidal cavity similarly vaned and pocketed, concentric, and proximate to the impeller cavity.

4. The liquid vaporizer according to claim 1, wherein:

the impeller means comprises one or more disks;

the chamber comprises a housing enclosing the impeller means with proximate surfaces and includes, in the case of more than one impeller disk, partitions separating adjacent impeller disk faces from one another and thereby forming an individual stator chamber for each impeller disk; and the impeller disk or disks, and partition wall or walls in the case of more than one impeller disk, include vent holes large enough to allow ready egress of vapor, without large pressure gradients, from both sides of each impeller disk individual stator chamber.

5. The liquid vaporizer according to claim 1, further including a short tubular extension of the vapor exit opening projecting into the chamber as a means of retaining liquid from pouring out by gravity when the vaporizer is disposed with vertical axes of impeller rotation and of vapor exit opening with the vapor exiting downwardly.

6. The liquid vaporizer according to claim 1, further including suitable speed and torque measurement and control means for use as an absorption dynamometer, whereby substantially less liquid coolant is needed than is for water brake dynamometers which do not vaporize their liquid coolant.

7. The liquid vaporizer according to claim 2, further including suitable speed and torque measurement and control means for use as an absorption dynamometer, whereby substantially less liquid coolant is needed than is for water brake dynamometers which do not vaporize their liquid coolant.

8. The liquid vaporizer according to claim 3, further including suitable speed and torque measurement and control means for use as an absorption dynamometer, whereby substantially less liquid coolant is needed than is for water brake dynamometers which do not vaporize their liquid coolant.

9. The liquid vaporizer according to claim 4, further including suitable speed and torque measurement and control means for use as an absorption dynamometer, whereby substantially less liquid coolant is needed than is for water brake dynamometers which do not vaporize their liquid coolant.

10. The liquid vaporizer according to claim 5, further including suitable speed and torque measurement and control means for use as an absorption dynamometer, whereby substantially less liquid coolant is needed than is for water brake dynamometers which do not vaporize their liquid coolant.

11. The liquid vaporizer according to claim 1, further including suitable speed, torque, or speed and torque control means for use as motion retarder, whereby substantially less liquid coolant is needed than is for water brake motion retarders which do not vaporize their liquid coolant.

12. The liquid vaporizer according to claim 2, further including suitable speed, torque, or speed and torque control means for use as motion retarder, whereby substantially less liquid coolant is needed than is for water brake motion retarders which do not vaporize their liquid coolant.

13. The liquid vaporizer according to claim 3, further including suitable speed, torque, or speed and torque control means for use as motion retarder, whereby substantially less liquid coolant is needed than is for water brake motion retarders which do not vaporize their liquid coolant.

14. The liquid vaporizer according to claim 4, further including suitable speed, torque, or speed and torque control means for use as motion retarder, whereby substantially less liquid coolant is needed than is for water brake motion retarders which do not vaporize their liquid coolant.

15. The liquid vaporizer according to claim 5, further including suitable speed, torque, or speed and torque control means for use as motion retarder, whereby substantially less liquid coolant is needed than is for water brake motion retarders which do not vaporize their liquid coolant.

16. Use of water brakes which vaporize substantially all their liquid coolant as dynamometers, whereby substantially less liquid coolant is needed than is for water brake dynamometers which do not vaporize substantially all their liquid coolant.

17. Use of water brakes which vaporize substantially all their liquid coolant as motion retarders, whereby substantially less liquid coolant is needed than is for water brake motion retarders which do not vaporize substantially all their liquid coolant.

* * * * *

UNITED STATES PATENT AND TRADEMARK OFFICE
CERTIFICATE OF CORRECTION

PATENT NO.   : 5,279,262
DATED        : Jan. 18, 1994
INVENTOR(S)  : Norman J. Muehleck Page 1 of 2

It is certified that error appears in the above-indentified patent and that said Letters Patent is hereby corrected as shown below:

Col. 1, line 53, change "$Q_x(P)[...$" to --$Q_x = (P)[...$--

Col. 2, line 14, change "$IQ_v$" to --$Q_v$--

Col. 2, line 17, change "[142.4..." to --[42.4...--

Col. 2, line 27, change "$Q_v 0.005*...$" to --$Q_v = 0.005*...$--

Col. 3, line 19, change "14277020" to --4277020--

Col. 3, line 29, change "water" " to --"water"--

Col. 4, line 15, change "vertical,," to --vertical,--

Col. 7, line 53, change "torn" to --torii--

Col. 8, line 12, change "The embodiment" to --  The embodiment--- (i.e., add indentation to begin new paragraph)

UNITED STATES PATENT AND TRADEMARK OFFICE
CERTIFICATE OF CORRECTION

PATENT NO. : 5,279,262
DATED : Jan. 18, 1994
INVENTOR(S) : Norman J. Muehleck

It is certified that error appears in the above-indentified patent and that said Letters Patent is hereby corrected as shown below:

```
Col. 9, line 18, change "computation-and" to --computation
   and-- (i.e., delete hyphen)
```

Signed and Sealed this

Fifth Day of July, 1994

Attest:

BRUCE LEHMAN

*Attesting Officer*  *Commissioner of Patents and Trademarks*